United States Patent
Partridge et al.

(10) Patent No.: US 7,842,124 B2
(45) Date of Patent: Nov. 30, 2010

(54) POLYMER MEMBRANE FOR SEPARATING AROMATIC AND ALIPHATIC COMPOUNDS

(75) Inventors: Randall D. Partridge, Califon, NJ (US); Dennis G. Peiffer, Annadale, NJ (US); David C. Dalrymple, Bloomsbury, NJ (US); Walter Weissman, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 492 days.

(21) Appl. No.: 11/890,633

(22) Filed: Aug. 7, 2007

(65) Prior Publication Data
US 2008/0035575 A1    Feb. 14, 2008

Related U.S. Application Data

(60) Provisional application No. 60/836,318, filed on Aug. 8, 2006.

(51) Int. Cl.
*B01D 53/22*    (2006.01)
*B01D 15/00*    (2006.01)

(52) U.S. Cl. .............. 95/50; 95/45; 95/49; 210/500.39; 210/640; 210/321.6; 96/4; 96/10

(58) Field of Classification Search ...............
210/500.37–500.39, 490, 321.6, 321.8, 321.74, 210/640; 95/45, 49, 50; 96/4, 6, 10, 11, 96/14
See application file for complete search history.

(56) References Cited

U.S. PATENT DOCUMENTS

| | | | | |
|---|---|---|---|---|
| 4,705,540 A | * | 11/1987 | Hayes | ............................. 95/51 |
| 4,717,393 A | * | 1/1988 | Hayes | ............................. 95/51 |
| 4,880,442 A | * | 11/1989 | Hayes | ............................. 95/51 |
| 5,110,879 A | | 5/1992 | Chung et al. | |
| 5,262,056 A | * | 11/1993 | Koros et al. | .................. 210/654 |
| 5,591,250 A | * | 1/1997 | Stern et al. | ...................... 95/51 |
| 5,670,052 A | * | 9/1997 | Ho et al. | ....................... 210/651 |
| 5,756,643 A | | 5/1998 | Ho et al. | |
| 6,383,258 B1 | * | 5/2002 | Simmons | ......................... 95/45 |
| 6,660,062 B2 | * | 12/2003 | Liu et al. | ......................... 95/45 |
| 7,247,191 B2 | * | 7/2007 | Koros et al. | ..................... 96/13 |
| 7,265,182 B2 | * | 9/2007 | Lin et al. | ...................... 525/183 |
| 7,422,623 B2 | * | 9/2008 | Ekiner et al. | ..................... 95/45 |

* cited by examiner

*Primary Examiner*—Ana M Fortuna

(57) ABSTRACT

This invention relates to a polymeric membrane composition comprising an associating polymer. The polymer coating is characterized as having hard and soft segments where the hard segment comprises TMPA, combined with HDPA. The membrane may utilize a porous substrate.

20 Claims, 3 Drawing Sheets

POLYMER MEMBRANE FOR SEPARATING AROMATIC AND ALIPHATIC COMPOUNDS

This application claims the benefit of U.S. Provisional Application No. 60/836,318 filed Aug. 8, 2006.

FIELD OF THE INVENTION

This invention relates to a polymeric membrane composition utilizing the non-hazardous compound 4,4'-(hexafluoroisopropylidene)diphthalic anhydride ("HPDA") and 2,3,5,6-tetramethyl-1,4-phenylene diamine ("TMPA"), a method of making the polymeric membrane, and a process for separating components of a feedstream utilizing the polymeric membrane. More particularly, but not by way of limitation, this invention relates to the polymeric membrane composition and its use in a process for the separation of aromatics from a hydrocarbon feedstream containing aromatics and aliphatic compounds.

BACKGROUND OF THE INVENTION

Polymeric membrane based separation processes such as reverse osmosis, pervaporation and perstraction are conventional. In the pervaporation process, a desired feed component, e.g., an aromatic component, of a mixed liquid feed is preferentially absorbed by the membrane. The membrane is exposed at one side to a stream comprised of a mixture of liquid feeds and a vacuum is applied to the membrane at the opposite side so that the adsorbed component migrates through the membrane and is removed as a vapor from the opposite side of the membrane via a solution-diffusion mechanism. A concentration gradient driving force is established to selectively pass the desired components through the membrane from its feed or upstream side to its permeate or downstream side.

The perstraction process is utilized to separate a liquid stream into separate products. In this process, the driving mechanism for the separation of the stream into separate products is provided by a concentration gradient exerted across the membrane. Certain components of the fluid will preferentially migrate across the membrane because of the physical and compositional properties of both the membrane and the process fluid, and will be collected on the other side of the membrane as a permeate. Other components of the process fluid will not preferentially migrate across the membrane and will be swept away from the membrane area as a retentate stream. Due to the pressure mechanism of the perstraction separation, it is not necessary that the permeate be extracted in the vapor phase. Therefore, no vacuum is required on the downstream (permeate) side of the membrane and permeate emerges from the downstream side of the membrane in the liquid phase. Typically, permeate is carried away from the membrane via a swept liquid.

The economic basis for performing such separations is that the two products achieved through this separation process (i.e., retentate and permeate) have a refined value greater than the value of the unseparated feedstream. Membrane technology based separations can provide a cost effective processing alternative for performing the product separation of such feedstreams. Conventional separation processes such as distillation and solvent extraction can be costly to install and operate in comparison with membrane process alternatives. These conventional based processes can require a significant amount of engineering, hardware and construction costs to install and also may require high levels of operational and maintenance personnel costs to maintain the associated facilities in an operating status. Additionally, most of these processes require the heating of the process streams to relatively high temperatures in order to separate different components during the processing steps resulting in higher energy costs than are generally required by low-energy membrane separation processes.

A major obstacle in perfecting the commercial operation of membrane separation technologies is to improve the flux and selectivity characteristics of the current membrane systems in order to make the construction costs and separation efficiencies of membrane technologies economically viable, for example, on a refinery scale operations and on-board vehicle separation processes.

A myriad of polymeric membrane compositions have been developed over the years. Such compositions include polyurea/urethane membranes (U.S. Pat. No. 4,914,064); polyurethane imide membranes (U.S. Pat. No. 4,929,358); polyester imide copolymer membranes (U.S. Pat. No. 4,946,594); polyimide aliphatic polyester copolymer membranes (U.S. Pat. No. 4,990,275); and diepoxyoctane crosslinked/esterfied polyimide/polyadipate copolymer (diepoxyoctane PEI) membranes (U.S. Pat. No. 5,550,199).

These copolymeric membranes are generally comprised of "soft segments" and "hard segments" which form polymer chains in the membrane. The soft segments of the polymer generally provide the active area for the selective diffusion of the permeate through the membrane. However, these soft segments of the membrane have limited structural and thermal strength characteristics. Therefore, in order to provide structural strength to the membrane, a hard segment polymer (e.g;, the reaction product of a dianhydride and a diamine) is added to the soft segment polymer in a suitable solvent to form long copolymer chains in the final membrane preferably comprised of alternating soft and hard polymer segments. These hard segments provide significant mechanical and thermal stability to the membrane, but are essentially non-permeable to the process stream components. These copolymer membranes of the prior art then undergo a high temperature "thermal cross-linking" to further promote molecular bonding between these copolymer chains in the final membrane composition.

For a given polymeric membrane composition, the flux across a given membrane is generally inversely proportional to the thickness of the membrane. Therefore, the cross-section of a constructed membrane is commonly very thin (on the order of about 0.1 to about 50 microns) in order to derive the selectivity benefit of the membrane while maximizing the flux characteristics of the membrane. However, for a membrane operated at constant feed composition and process conditions, the selectivity of a particular membrane composition is substantially independent of the thickness of the membrane and is principally dependent upon the compositional characteristics of the membrane.

Therefore, in order to increase the selectivity for membrane processes, new membrane compositions must be discovered that have improved selectivity characteristics. Although a high flux capacity of a membrane is desired, deficiencies in a membrane composition's flux characteristics can be overcome by increasing the active membrane area or fabricating membranes of thinner cross sections. Similar "mechanical variables" generally cannot be utilized to improve a membrane composition's inherent selectivity performance.

Additionally, some of the compounds that are utilized in the present art for the fabrication of polymeric membranes are potentially toxic or harmful to the environment, thereby posing manufacturing challenges.

The use of hazardous components in the fabrication of polymeric membranes also results in higher costs of manufacturing due to increased shipping and handling costs as well as higher costs for the installation, operation and maintenance of personnel and environmental protective equipment required for the manufacture and handling of these compounds. Therefore, in addition to the potential health concerns and potential adverse environment aspects of utilizing hazardous components, there is also is an economically driven need in the industry associated with the discovery and utilization of new non-hazardous materials for the fabrication of membranes which can meet or exceed the processing capabilities and durability of the polymeric membranes of the prior art.

Therefore there is a need in the industry for new membrane compositions with improved inherent selectivity characteristics. There is also a separate need in the industry for new membrane compositions utilizing materials which possess non-toxic and minimal negative environmental impact properties.

SUMMARY OF THE INVENTION

The present invention relates to a polymeric membrane composition utilizing the non-hazardous compound HPDA and TMPA, a method of making the polymeric membrane, and a process for separating components of a feedstream utilizing the polymeric membrane. In particular, the polymeric membrane is utilized in a process for selectively separating aromatics from a hydrocarbon feedstream comprised of aromatic and aliphatic hydrocarbons.

In one embodiment, the present invention relates to the composition of a polymeric membrane effective in selectively separating components of a hydrocarbon feedstream. In particular, the present invention relates to the composition of a polymeric membrane effective in the selective separation of aromatics from a hydrocarbon stream containing both aromatics and non-aromatics. This invention results in a membrane composition with improved membrane physical integrity and improved separation characteristics over the prior art. Another important aspect is that this new polymeric membrane composition utilizes a non-hazardous component that eliminates the need for potentially hazardous polymer chain-extension compounds utilized in the prior art.

In an embodiment, the present invention relates to a copolymer composition of matter comprised of a polyimide hard segment and a soft segment containing an aliphatic polyester wherein said polyimide hard segment is comprised of HPDA and TNPA.

In a preferred embodiment, the soft segment of the membrane composition is an aliphatic polyester comprised of one or more compounds selected from the group consisting of a polyadipate, a polysuccinate, a polymalonate, a polyoxalate, and a polyglutarate.

DETAILED DESCRIPTION OF THE PREFERRED EMBODIMENTS

Figure 1:
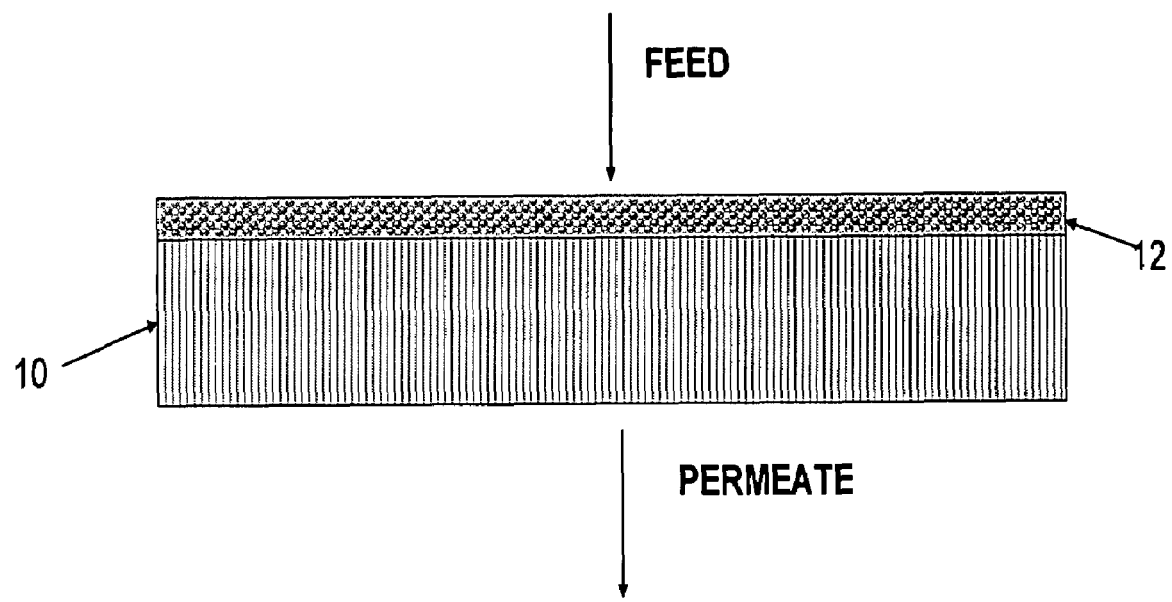
FIG. 1 illustrates a simple embodiment of the present invention.

As used herein, the term "hydrocarbon" means an organic compound having a predominantly hydrocarbon character. Accordingly, organic compounds containing one or more non-hydrocarbon radicals (e.g., sulfur or oxygen) would be within the scope of this definition. As used herein, the terms "aromatic hydrocarbon" or "aromatic" means a hydrocarbon-based organic compound containing at least one aromatic ring. The rings may be fused, bridged, or a combination of fused and bridged. In a preferred embodiment, the aromatic species separated from the hydrocarbon feed contains one or two aromatic rings. The terms "non-aromatic hydrocarbon" or "non-aromatic" or "saturate" means a hydrocarbon-based organic compound having no aromatic cores. Also as used herein, the terms "thermally cross-linked" or "thermal cross-linking" means a membrane curing process at curing temperatures typically above about 250 to about 400° C. (482 to 572° F.) characterized by hydrogen bonding of neighboring polymeric chains in solution. The term "chemically cross-linked" or "chemical cross-linking" means a chemical curing process characterized by the principal reaction of chemical bonding of neighboring polymeric chains in solution via imidization/esterification thereby forming a three-dimensional polymer network. Also as used herein, the term "selectivity" means the ratio of the desired component(s) in the permeate to the non-desired component(s) in the permeate divided by the ratio of the desired component(s) in the feedstream to the non-desired component(s) in the feedstream. Also, the term "flux" or "normalized flux" is defined the mass rate of flow of the permeate across a membrane usually in dimensions of Kg/m$^2$-day, Kg/m$^2$-hr, Kg-μm/m$^2$-day, or Kg-μm/m$^2$-hr. Also used herein, the term "selective" means that the described part has a tendency to allow one or more specific components of the feedstream to preferentially pass through that part with respect to the other feedstream components. The terms "non-aromatics" and "aliphatics" are used interchangeably in this document. "Hard segment," as used herein, means a segment of the polymer that has a glass transition temperature greater than approximately 100° C. "Soft segment," as used herein, means a polymer segment that is a relatively lower modulus/elastomeric segment (relative to the hard segment) and has a glass transition temperature less than approximately 100° C.

The present invention is a polymeric membrane having a "soft" segment comprising an aliphatic polyester and a "hard" polyimide segment comprising combinations of diamines and dianhydrides. A preferred embodiment of the present invention combines a diphthalic anhydride 4,4'-(hexafluoroisopropylidene) ("HPDA") and a diamine 2,3,5,6-tetramethyl-1,4-phenylene ("TMPA") to produce a co-polymer membrane useful in processes for separating components of a feedstream, and in particular, useful in the selective separation of aromatics from a hydrocarbon stream comprised of both aromatics and non-aromatics.

In a preferred embodiment, the membrane of the present invention comprises a multiblock structure of hard segments and soft segments, more preferably in an alternating hard-soft-hard-soft configuration. The soft segment is generally a aliphatic polyester, and more specifically a polyadipate, a polysuccinate, a polymalonate, a polyoxalate, a polyglutarate, or combinations thereof. Exemplary soft segments include polyethylene adipate (PEA).

A particularly noteworthy aspect of the present invention is the "hard" segment of the membrane. In the present invention, the hard segment comprises a polyimide that contains 4,4'-(hexafluoroisopropylidene)diphthalic anhydride ("HPDA") and 2,3,5,6-tetramethyl-1,4-phenylene diamine ("TMPA"). The term contains, as used herein, means the components of the hard segment phase. Though not intending to be bound to a particular theory of its functionality, it is presently understood that the hard segments of the present invention affect the selectivity and flux of the membrane, both by means of altering the overall composition and volume fraction of the hard phase of the membrane, and by altering the molecular geometry (i.e. chain packing and dynamics of the membrane whereby the structure of the resulting membrane facilitates permeation of certain size feed molecules, while impeding the permeation of larger molecules.

Another novel aspect of the present invention is the process for making the hard/soft segments membrane. The present invention employs polyamic acid as a precursor to form the polyimide of the membrane. These polyamic acids are best described as associating polymers, as further described herein.

The associating functionalities are understood to substantially facilitate deposition of the membrane polymer. The invention is not limited to the use of polyamic acid-type associating polymers, but to the use of associating polymer structures in general. These families of copolymers, for example, include functionalities possessing hydrogen-bonding interactions (e.g., polyamic acids), dipolar interactions, hydrophobic, and ionic interactions. Membrane formation, performance, and utility are directly related to the structural components comprising the copolymer structure. Associating polymers provide an effective molecular weight higher then the molecular weight of the individual polymer chains. In a preferred embodiment, the associating polymers can be formed in a facile manner under anhydrous conditions, which typically allow for formation of individual polymer chains of higher molecular weight. Higher molecular weight polymers are desirable in order to produce coherent, uniform, and thin polymer membranes. Another aspect of this invention is that various combinations of diamines, dianhydrides and difunctional soft segments can be incorporated into the copolymer structure to form a wide variety of multi-compositional polyamic acids that can be coated, dried and chemically cured on the surface of the porous inorganic substrate. Another aspect of this invention is the ability to effectively and efficiently coat the inner and/or outer surfaces of porous inorganic substrates such as a tubular ceramic or monolith, for example. Different polyimide structures or a wide variety of alternative copolymer structures can be coated on the inner and outer surfaces of the inorganic support. Assembly by these methodologies lends itself to highly automated manufacture with excellent quality control.

In completing the synthesis of polymer, the polymer is crosslinked by using a crosslinking agent such as a diepoxide for example. In one embodiment, the crosslinking reaction is understood to occur among pendant carboxylic acid groups adjacent to the ester linkage located between polyimide hard segments and polyester soft segments. Although not fully understood, these reactions are believed to include reactions of the diepoxide with the hydroxyl groups at the surface with the inorganic substrate.

Another aspect of the invention is the ability to create different zones along the length of the membrane using different membrane compositions tailored to the changing feed composition to optimize membrane permeation and selectivity. These membranes can be used in numerous applications where efficient and effective separation of aromatics and aliphatics are required, e.g., on-board separation of fuels in automobiles and trucks, refinery and other downstream operations, upstream applications, and the like.

An exemplary synthesis route is described below for a polyimide co-polymer:

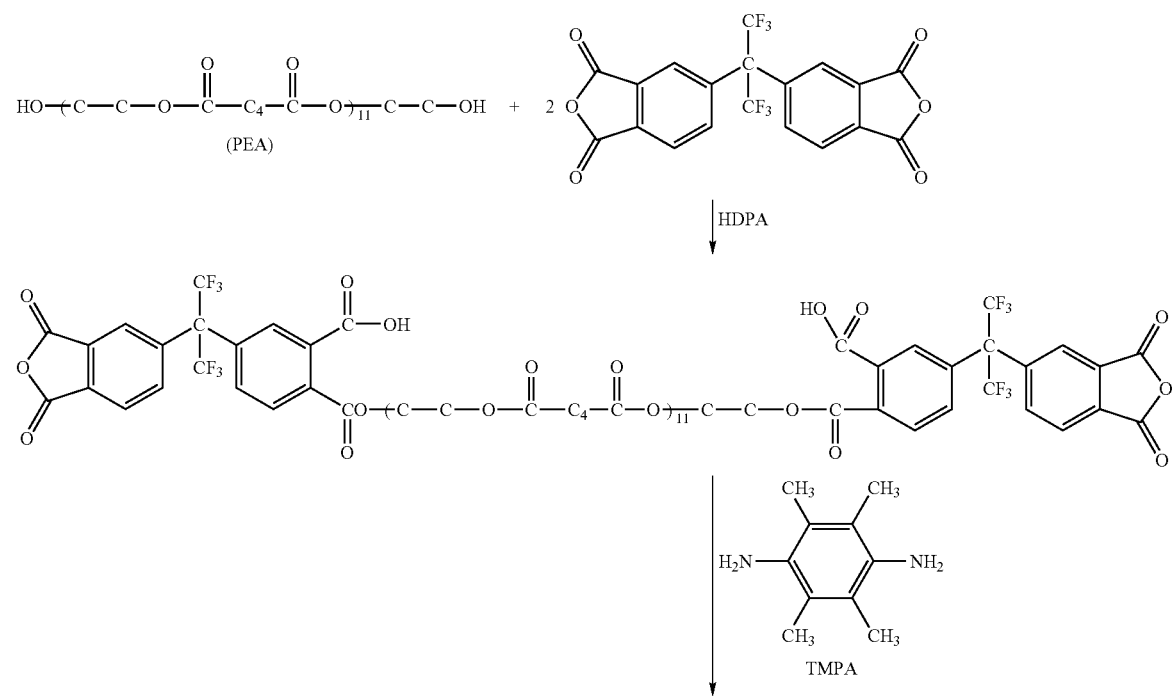

-continued

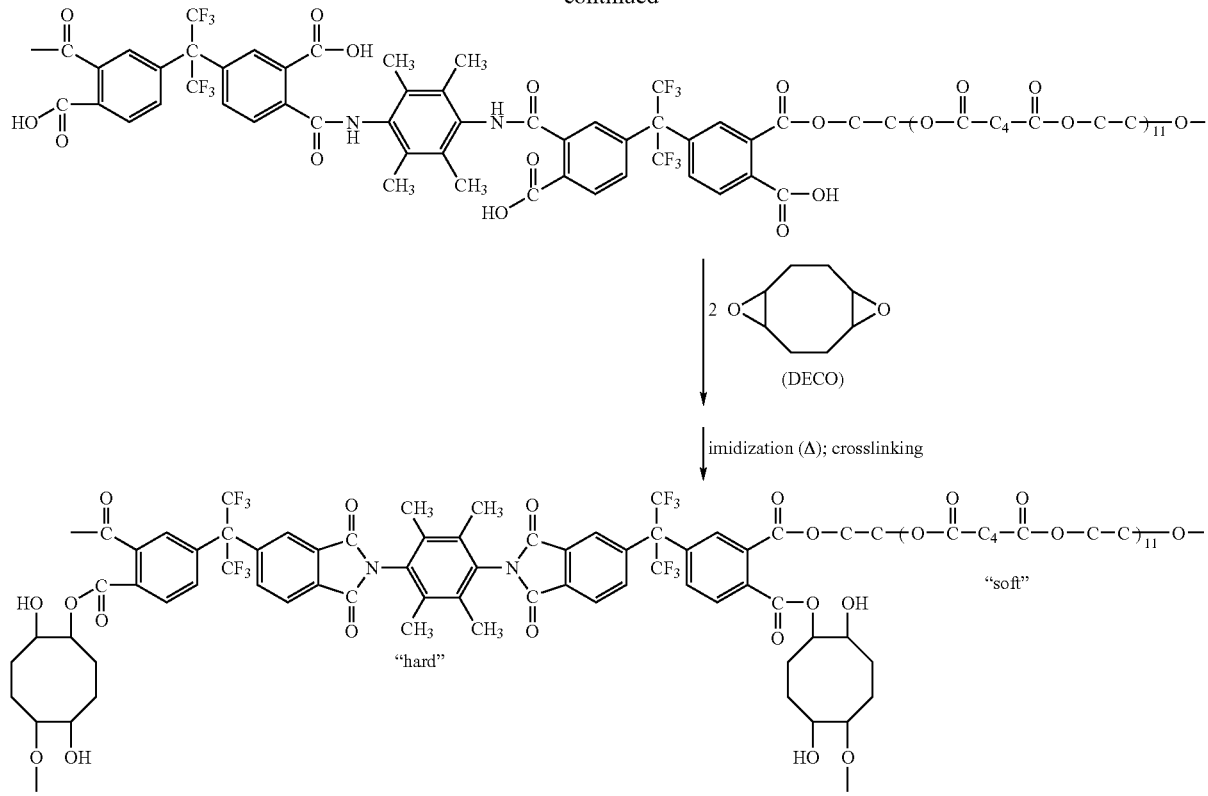

(DECO)

imidization (Δ); crosslinking

"hard" "soft"

The resulting membrane composition possesses improved selectivity properties. The present invention also eliminates the need for hazardous chain-extension compounds in membrane compositions of the prior art.

Referring to FIG. 1, there is shown a polymer coated porous substrate membrane system in accordance with the present invention. Though not required in all applications of the present invention, a porous substrate may be used for physical support and enhanced membrane integrity. A substrate 10, here shown as disposed under layer 12, comprises a porous material such as Teflon®, for example. Substrate 10 is characterized as comprising a porous material, suitable for physical support of the polymeric membrane detailed hereinafter. The porosity of the substrate is selected based upon the feed materials that it will be used for separating. That is, the pore size of the substrate is selected to provide little or no impedance to the permeation of the materials that are intended to be the permeate of the overall membrane system. Suitable organic substrates include Teflon®, for example. Suitable inorganic substrates include alumina, silica, titania, zirconia and the like. In a preferred embodiment, porous substrate 10 comprises an inorganic ceramic material such as silica, alumina, or a combination thereof. It is also preferred that the ceramic substrate is substantially permeable to hydrocarbon liquid such as gasoline, diesel, and naphtha for example. It is also preferred that the pore size distribution is asymmetric in structure, e.g., a smaller pore size coating is supported on a larger pore size inorganic structure.

Membrane 12 comprises a co-polymer composition having polyimide "hard" segments, and soft segments comprising an aliphatic polyester such as a polyadipate, for example. More specifically, the "hard" segments contain a diphthalic anhydride 4,4'-(hexafluoroisopropylidene) ("HDPA") and a diamine, 2,3,5,6-tetramethyl-1,4 phenylene ("TMPA").

The invention is not limited to the use of a polyadipate to form the membrane soft segments. Other compounds may also be utilized in the membrane compositions of the present invention including, but not limited to, a polysuccinate, a polymalonate, a polyoxalate, and a polyglutarate. Different soft segment materials may be utilized to obtain desired final separation characteristics (e.g., flux and selectivity) as well as to obtain a composition that may have unique or superior manufacturing and handling properties. It should also be noted that mixtures of different molecular weight concentrations also may be utilized in the manufacturing process to alter or improve the final process characteristics of the membrane.

In another preferred embodiment, the membrane composition is comprised of a polyimide hard segment and a soft segment that are chemically cross-linked with improved glass transition temperatures ($T_g$) of the hard and soft segments of the resultant membranes. In a preferred embodiment of the present invention, the membrane has a soft segment $T_g$ of less than 212° F. (100° C.), preferably less than 167° F. (75° C.), more preferably less than −13° F. (−25° C.). In another embodiment, the membrane also has a hard segment $T_g$ of greater than 212° F. (100° C.), preferably greater than 248° F. (120° C.). All glass transition temperatures referenced herein are based measurements taken from a solvent-free membrane after fabrication and prior to exposure to any external feed or pre-treatment media (i.e., in the "unswollen" condition).

In a yet another preferred embodiment, the membrane composition of the present invention is comprised of polyethylene adipate (PEA), reacted with HPDA to form a prepolymer to which TMPA is added, and a chemical cross-linking compound such as diepoxycyclo-octane.

In another more preferred embodiment, the polyethylene adipate (PEA) is present in a molar range of about 0.25 to about 2.0, the 4,4'-(hexafluoroisopropylidene diphthalic anhydride) (HPDA) is present in a molar range of about 0.5 to about 4.0, the diamine (TMPA) is present in a molar range of about 0.25 to about 2.0, and the chemical cross-linking compound is present in a molar range of about 0.5 to about 4.0. More preferably, the polyethylene adipate (PEA) is present in a molar range of about 0.5 to about 1.5, the diphthalic anhydride (HPDA) is present in a molar range of about 1.0 to about 3.0, the diamine (TMDA) is present in a molar range of about 0.5 to about 1.5, and the chemical cross-linking compound is present in a molar range of about 1.0 to about 3.0. Even more preferably, the polyethylene adipate (PEA), the diphthalic anhydride (HPDA), the diamine (TMDA), and chemical cross-linking agent are present in molar amounts of substantially 1, 2, 1, and 2, respectively.

In another preferred embodiment, the chemical cross-linking agent is selected from diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, and poly(propylene glycol)diglycidyl ether. Preferably, the chemical cross-linking agent is selected from diepoxycyclooctane, diepoxyoctane, and 1,3-butadiene diepoxide.

The membrane compositions and configurations of the present invention can also be utilized in both unsupported and supported configurations. A non-limiting example of an unsupported membrane configuration includes casting the membrane on a glass plate and subsequently removing it after the chemical cross-linking reaction is completed. Non-limiting examples of supported membrane configurations include casting the membrane onto a support material fabricated from materials such as, but not limited to, porous polytetrafluoroethylene (e.g., Teflon®), aromatic polyamide fibers (e.g., Nomex® and Kevlar®), porous metals, sintered metals, porous ceramics, porous polyester, porous nylon, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides, metal and polymer foams (open-cell and closed-cell foams), silica, porous glass, mesh screens, and combinations thereof. Preferably, the polymeric membrane support is selected from polytetrafluoroethylene, aromatic polyamide fibers, porous metals, sintered metals, porous ceramics, porous polyesters, porous nylons, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides and combinations thereof.

The membrane compositions and configurations of the present invention can be employed in separation processes that employ a membrane in any workable housing configuration such as, but not limited to, flat plate elements, wafer elements, spiral-wound elements, porous monoliths, porous tubes, or hollow fiber elements.

Alternative preferred embodiments for support configurations, support compositions, and methods for incorporating the membrane compositions described herein onto such supports are more fully described in a concurrently filed, U.S. patent application Ser. No. 60/836,319 entitled "Polymer-Coated Inorganic Membrane for Separating Aromatic and Aliphatic Compounds" which is herein incorporated by reference.

The membranes described herein are useful for separating a selected component or species from a liquid feed, a vapor/liquid feed, or a condensing vapor feeds. The resultant membranes of this invention can be utilized in both perstractive and pervaporative separation processes.

In a preferred embodiment, the permeate is removed from the permeate zone by a liquid or vapor sweep stream. The permeate dissolves into the sweep stream and is conducted away by sweep stream flow in order to prevent the accumulation of permeate in the permeate zone.

Membrane separation will preferentially operate at a temperature less than the temperature at which the membrane performance would deteriorate or the membrane would be physically damaged or chemically modified (e.g. oxidation). For hydrocarbon separations, the membrane temperature would preferably range from about 32° F. to about 950° F. (0 to 510° C.), and more preferably from about 75° F. to about 500° F. (24 to 260° C.).

In a still another preferred embodiment, the operating pressure range in the retentate zone is from about atmospheric pressure to about 150 psig. The operating pressure ranges in the permeate zone is from about atmospheric pressure to about 1.0 mm Hg absolute.

The membranes of this invention are useful for separating a desired species or component from a feedstream, preferably a hydrocarbon feedstream.

In a preferred embodiment, the membrane compositions and configurations above are utilized for the selective separation of aromatics from a hydrocarbon feedstream containing aromatics and non-aromatics.

In another embodiment, the membrane compositions and configurations above are utilized to selectively separate sulfur and nitrogen heteroatoms from a hydrocarbon stream containing sulfur heteroatoms and nitrogen heteroatoms.

In still another embodiment, the hydrocarbon feedstream is a naphtha with a boiling range of about 80 to about 450° F. (27 to 232° C.), and contains aromatic and non-aromatic hydrocarbons. In a preferred embodiment, the aromatic hydrocarbons are separated from the naphtha feedstream. As used herein, the term naphtha includes thermally cracked naphtha, catalytically cracked naphtha, and straight-run naphtha. Naphtha obtained from fluid catalytic cracking processes ("FCC") are particularly preferred due to their high aromatic content.

In a still another preferred embodiment, under pervaporation conditions, the operating pressure range in the retentate zone would preferably be from about atmospheric pressure to about 150 psig. The operating pressure ranges in the permeate zone would preferably be from about atmospheric pressure to about 1.0 mm Hg absolute.

Figure 2:
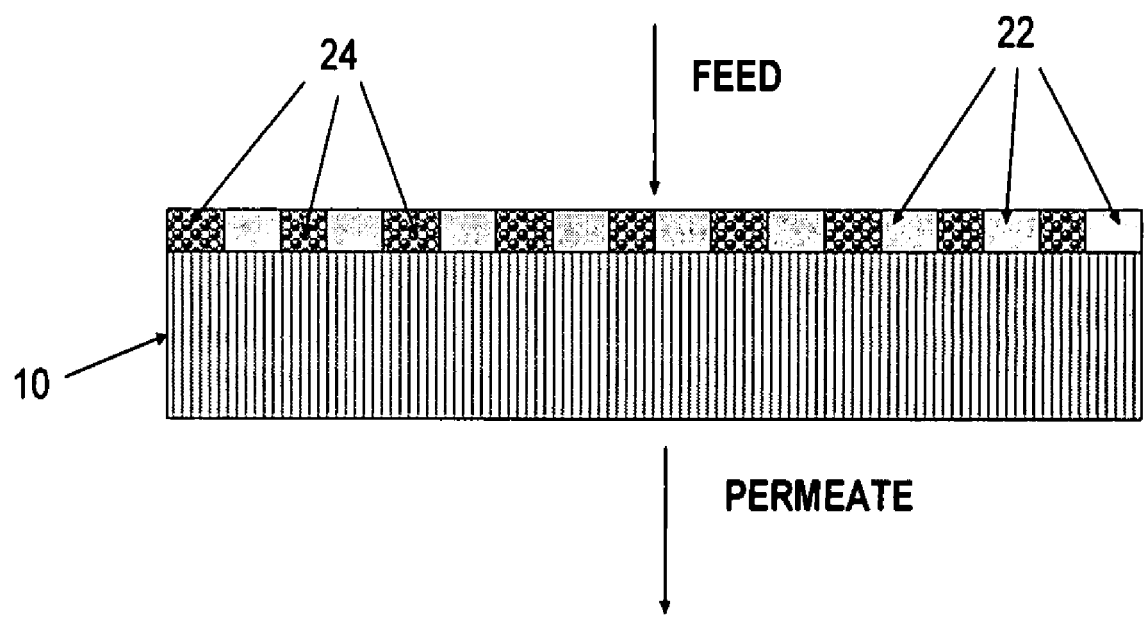
FIG. 2 illustrates a simple embodiment of the membrane system of the present invention having hard and soft segments.

FIG. 2 illustrates the "hard" and "soft" segments of the present invention. A first or "hard segment" (22) is characterized as having a glass transition temperature greater than about 100° C. The hard segments (22) are preferably distributed along the polymer structure in an alternating fashion as illustrated in the figure. The hard segments (22) comprise a polyimide. More particularly, the hard segments are a polyimide that comprise 4,4'-(hexafluoroisoproplidene)diphthalic anhydride ("HDPA") and 2,3,5,6-tetramethyl-1,4-phenylene diamine ("TMPA").

A "soft segment" (24) is characterized as having a glass transition temperature less than about 100° C. The soft segments are preferably distributed in alternating fashion, as illustrated in the figure. The soft segments (24) generally comprise an aliphatic polyester, preferably having a lower modulus than the hard segments (22). Suitable soft segments (24) comprise polyadipates, polysuccinates, polymalonates, polyoxalates, or polyglutarates, for example. Not wanting to be held to any particular theory, it is believed that the "hard segment" improves the physical integrity of the co-polymer membrane, and also improves its adherence to substrates by chemical cross links to the surface of the substrate. The "soft segments" composition is believed to predominate the level of permeate solubility and diffusion resulting in the observed high selectivity and flux membrane characteristics of the membrane of the present invention. Stated otherwise, the feed preferentially diffuse through the "soft segments." The separation system may thereby be tailored to preferentially permeate certain feed constituents by controlling the amounts and/or locations of soft versus hard membrane segments.

The examples presented below exemplify the subject matter for this invention.

EXAMPLE 1

PEI-DECO-PEA 2000

Diepoxide crosslinked/esterified polyimide-aliphatic polyester copolymers have been synthesized from an oligomeric aliphatic polyester diol, an anhydride, a diamine, and a diepoxide. To illustrate the synthesis and composition of this "base" PEI copolymer, a diepoxycyclooctane crosslinked/esterified polyimide-polyadipate copolymer (diepoxycyclooctane polyethylene imide [PEI]) membrane was used. In the synthesis, 5 g (0.0025 moles) of polyethyleneadipate (PEA) diol (2000 g/mole) is reacted with 1.08 g (0.005 moles) of pyromellitic dianhydride (PMDA) to make a prepolymer in the end-capping step (165° C./6.5 hours). 25 g of dimethylformamide (DMF) was added. The temperature was decreased to 70° C. The prepolymer was dissolved in a suitable solvent such as dimethylformamide. 0.67 g (0.0025 moles) of 4,4'-methylene bis(2-chloroaniline) (MOCA) is subsequently added (dissolved in 5g DMF). In the DMF solution, one mole of the prepolymer was reacted with one mole of MOCA to make a copolymer containing polyamic acid hard segment and PEA soft segment in the chain-extension step. An additional 59.5 g of DMF is added. Subsequently, 89.5 g acetone is added to prevent gelling. The solution was stirred for 1.5 hours at 70° C., then cooled to room temperature under continual stirring conditions. Diepoxycyclooctane (DECO), the chemical crosslinker, was added (0.7 g) to the copolymer-DMF solution at a diepoxide/PEA molar ratio of 2. The copolymer membrane was prepared by casting (i.e., film coating) the solution onto a porous support (e.g., 0.2 micron porous Gortex® Teflon®) and a glass plate, adjusting the thickness by means of a casting knife, drying the membrane first at a suitable temperature (e.g., room temperature) to remove most of the solvent (i.e., solvent evaporation), and curing, (i.e., chemical crosslinking: 150° C. for 1.5 hours) to cause the reaction of diepoxide with pendent carboxylic acid groups. In the initial drying step, DMF was evaporated from the membrane in a box purged with nitrogen gas at room temperature for approximately 12 hours. The curing step was also completed using a nitrogen gas purge. The resulting membrane is a crosslinked/esterified polyimide-polyadipate copolymer. The curing step converts the polyamide ester hard segment to the polyimide hard segment via the imide ring closure.

In the synthesis with PEA, PMDA, MOCA and diepoxide at a molar ratio of 1/2/1/2, the crosslinking reaction occurs among pendent carboxylic acid groups adjacent to the ester linkages located between polyimide hard segments and polyester soft segments. The degree of crosslinking can be varied by controlling the concentration of diepoxide incorporated into the multiblock structure. The performance of this base membrane is shown in Table 1.

EXAMPLE 2

PHTI-DECO-PEA 2000

The synthesis presented in Example 1 was modified to produce a membrane according to this invention.

Diepoxide crosslinked/esterified polyimide-aliphatic polyester copolymers have been synthesized from an oligomeric aliphatic polyester diol, an anhydride, a diamine, and a diepoxide or mixtures thereof. 5 g (0.0025 moles) of polyethyleneadipate (PEA) diol (2000 g/mole) was reacted with 2.22 g (0.005 moles) of 4,4'-(hexafluoroisopropylidene)diphthalic anhydride (HPDA) to make a prepolymer in the end-capping step (165° C./7.0 hours). 20 g of dimethylformamide (DMF) was added. The temperature was decreased to 70° C. The prepolymer was dissolved in a suitable solvent such as dimethylformamide. 0.41 g (0.0025 moles) of 2,3,5,6-tetramethyl-1,4-phenylene diamine (TMPA) was subsequently added (dissolved in 5 g DMF). In the DMF solution, one mole of the prepolymer reacted with one mole of MOCA to make a copolymer containing polyamic acid hard segment and PEA soft segment in the chain-extension step. An additional 64.5 g of DMF was added. Total amount of DMF added is 89.5 g. Subsequently, 89.5 g acetone was added to prevent gelling. Stir solution for 1.5 hours (70° C.). The solution was cooled to room temperature under continual stirring conditions. Diepoxycyclooctane (DECO), which is the chemical crosslinker, was added (0.7 g) to the copolymer-DMF solution at a diepoxide/PEA molar ratio of 2. The new copolymer membrane was prepared by casting (i.e., film coating) the solution onto a porous support (e.g., 0.2 micron porous Gortex® Teflon®) and a glass plate, adjusting the thickness by means of a casting knife, drying the membrane first at a suitable temperature (e.g., room temperature and 120° C. for one hour) to remove most of the solvent (i.e., solvent evaporation), and curing, (i.e., chemical crosslinking: 150° C. for 1.5 hours) to progress the reaction of diepoxide with pendent carboxylic acid groups. In the initial drying step, DMF was evaporated from the membrane in a box purged with nitrogen gas at room temperature for approximately 12 hours. The curing step was also completed using a nitrogen gas purge. The resulting membrane was a crosslinked/esterified polyimide-polyadipate copolymer. The curing step converted the polyamide ester hard segment to the polyimide hard segment via the imide ring closure.

In the synthesis with PEA, HPDA, TMPA and diepoxide crosslinker (DECO) at a molar ratio of 1/2/1/2, the crosslinking reaction occurs among pendent carboxylic acid groups adjacent to the ester linkages located between polyimide hard segments and polyester soft segments. The degree of crosslinking can be varied by controlling the concentration of diepoxide incorporated into the multiblock structure. The performance of this membrane is shown in Table 1.

EXAMPLE 3

The membrane produced in Examples 1, 2, and 3 were evaluated. The thickness of the membrane polymer coatings were about 10 microns to about 15 microns. Discs coupons of 4.7625 cm (1⅞") diameter were cut from the cured sheets for evaluation. Two discs were placed face to face to increase membrane thickness. The membranes were supported on a very fine flat stainless steel screen and sealed to the membrane holder with a teflon O-ring. The membrane holder was maintained at the desired temperature in a thermostated oven. The effective area of the membrane when evaluated was 9.5 cm$^2$. Membrane coupons were evaluated using a model gasoline feed having the following nominal composition (by wt): 10% 2,2,4-trimethylpentane (isooctane), 40% n-heptane, 20% toluene, 10% n-octane, 10% mesitylene, and 10% n-decane. The feed was preheated to the desired temperature and flowed over the membrane at 3.6 liters per hour. Typical temperatures ranged from 80 to 140° C. A vacuum of 2 mmHg was maintained on the opposing (screen) side of the membrane. Permeate was collected under vacuum using traps in series cooled with dry ice and liquid nitrogen respectively. Typical permeation rates of less than 2 g/hr were observed, corresponding to less than 0.06% permeate on feed. In effect, differential yields on feed.

Table 1 identified the results of using these various membranes in separating the aromatic and aliphatic components of the model feed. Feed was 60 cc/min, membrane area about 9.5 cm$^2$, 100° C., pressure (feed) about 262 kPa (gas), 2 mm vacuum. An examination of the data shows a marked improvement in the aromatic selectivity characteristics of the PHTI membrane.

TABLE 1

| Membrane Performance | | |
| --- | --- | --- |
| | PEI-DECO PEA2000 | PHTI-DECO PEA2000 |
| Example 1 | | |
| Flux at 100 C., (g-um/s-M$^2$) | 3.4 | 1.7 |
| Aromatic Selectivity | 5.0 | 6.8 |
| Toluene/Isooctane | 11.2 | 19.4 |
| Toluene/n-Heptane | 4.9 | 7.0 |
| Mesitylene/n-Decane | 5.6 | 6.1 |
| Example 2 | | |
| Flux at 140 C., (g-um/s-m$^2$) | 12.8 | 8.7 |
| Aromatic Selectivity | 3.8 | 5.0 |
| Toluene/Isooctane | 7.5 | 12.0 |
| Toluene/n-Heptane | 3.8 | 5.1 |
| Mesitylene/n-Decane | 4.3 | 5.0 |

Figures 3, 3A:
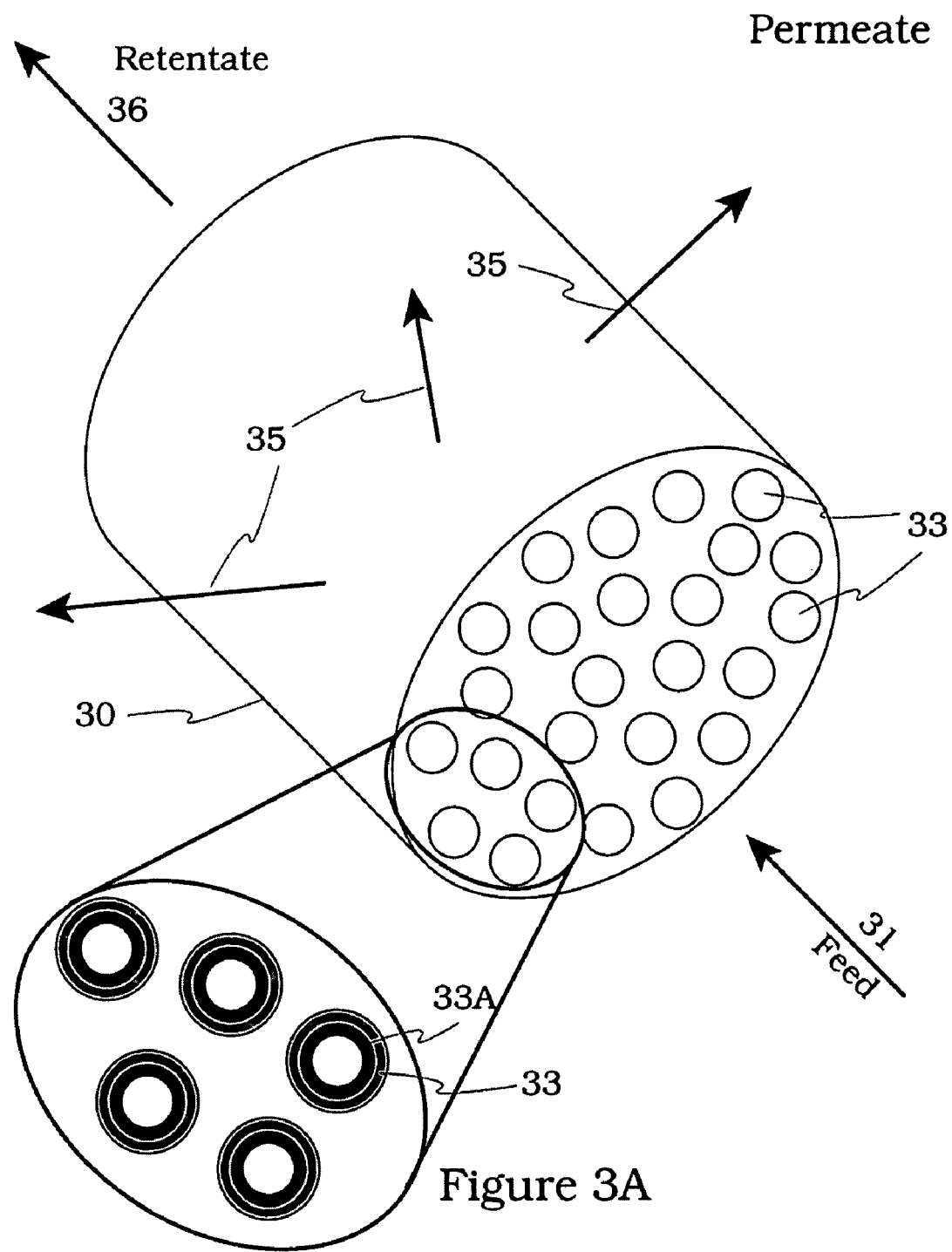
FIG. 3 illustrates the present invention using a tubular inorganic substrate.
FIG. 3a is a blown up view of a portion of the axial face section of the substrate shown in FIG. 3.

FIG. 3 illustrates an alternative embodiment using a tubular inorganic substrate. Referring to the figure, feed (31) is provided to a plurality of channels (33) within the porous inorganic substrate (30) which may comprise silica or alumina, for example. The surface(s) of the channels (33) may, in a preferred embodiment, comprise a porous inorganic material whose porosity differs from the bulk porosity of substrate (30). Most preferably, the surface porosity of the channels (33) is less than or about equal to the aggregate polymer size of the associating polymer. As illustrated in exploded view 3A, channels (33) have a surface region (33A) that may be formed by wash coating the interior surfaces of substrate (30)'s channels (33) to form a silica topcoat, for example.

The channels (33), with optimal surface region (33A) are coated with an associating polymer layer (34), such as that described in Example 1, to form the membrane system of the present invention.

In this exemplified configuration, permeate from the membrane system may be extracted radially as illustrated at (35), and retentate exiting axially as (36).

What is claimed is:

1. A copolymer membrane comprising a polyimide membrane hard segment and an aliphatic polyester membrane soft segment, wherein said polyimide membrane hard segment is comprised of at least one anhydride comprising 4,4' (hexafluoroisopropylidene) diphthalic anhydride (HPDA), and at least one diamine comprising 1,4-phenylene diamine (TMPA) and wherein the membrane soft segment is comprised of a compound selected from the group consisting of a polyadipate, a polysuccinate, a polymalonate, a polyoxalate, and a polyglutarate.

2. The copolymer membrane of claim 1, wherein the glass transition temperature, $T_g$, of the membrane soft segment is less than 212° F. (100° C.).

3. The copolymer membrane of claim 2, wherein the glass transition temperature, $T_g$, of the membrane soft segment is less than 167° F. (75° C.).

4. The copolymer membrane of claim 3, wherein the glass transition temperature, $T_g$, of the membrane soft segment is less than 122° F. (50° C.).

5. The copolymer membrane of claim 2, wherein the copolymer membrane comprises a polyimide-polyadipate co-polymer cross linked with a diepoxycyclo-octane.

6. The copolymer membrane of claim 1, wherein the polyadipate, the anhydride (HPDA), the 1,4-phenylene diamine (TMPA) and a cross-linking agent are present in molar ratios of about 0.5 to about 1.5, about 1.0 to about 3.0, about 0.5 to about 1.5, or about 1.0 to about 3.0, respectively.

7. The copolymer membrane of claim 6, wherein the glass transition temperature, $T_g$, of the membrane hard segment is greater than about 212° F. (100° C.).

8. The copolymer membrane of claim 7, wherein the glass transition temperature, $T_g$, of the membrane hard segment is greater than 248° F. (120° C.).

9. A membrane assembly comprising a housing containing at least one membrane element and at least one support material, wherein the membrane element is comprised of a polyimide hard segment and a soft segment; the polyimide hard segment is comprised of a dianhydride and TMPA and HPDA and the soft segment of the membrane is comprised of a compound selected from the group, consisting of a polyadipate, a polysuccinate, a polymalonate, a polyoxalate, and a polyglutarate.

10. The polymeric membrane assembly of claim 9, wherein the support material is selected from the group consisting of polytetrafluoroethylene, aromatic polyamide fibers, porous metals, sintered metals, porous ceramics, porous polyesters, porous nylons, activated carbon fibers, latex, silicones, silicone rubbers, polyvinylfluoride, polyvinylidenefluoride, polyurethanes, polypropylenes, polyethylenes, polycarbonates, polysulfones, polyphenylene oxides, metal foams, polymer foams, silica, porous glass, mesh screens, and combinations thereof.

11. The polymeric membrane assembly of claim 10, wherein the membrane clement and the support material are contained in a housing configuration selected from flat plate elements, wafer elements, spiral-wound elements, porous monoliths, porous tubes, and hollow fiber elements.

12. The polymeric membrane assembly of claim 11, wherein at least one membrane element is selected from the group consisting of a cross-linking agent selected from diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, and poly(propylene glycol) diglycidyl ether.

13. A method for making a polymeric membrane, comprising:
a) reacting a polyethylcneadipate with a anhydride HPDA to form a prepolymer;
b) adding diamine TMPA to the prepolymer to form a first solution;
c) adding a cross-linking agent to the first solution to form a second solution;
d) incorporating the second solution onto a suitable support; and
e) curing the second solution to form a membrane having hard and soft segments wherein the soft segments comprises a polyadipate, a polysuccinate, a polymalonate, a polyoxalate, or polyglutanate, or a combination thereof.

14. The method for making the polymeric membrane of claim 13, wherein the polyethyleneadipate, the anhydride HPDA, and the diamine TMPA, and the cross-linking agents are present in molar ratios of about 0.25 to about 2.0, about 0.5 to about 4.0, about 0.25 to about 2.0, or about 0.5 to about 4.0, respectively.

15. The method for making the polymeric membrane of claim 14, wherein the cross-linking agent is selected from the group consisting of diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, and poly(propylene glycol) diglycidyl ether.

16. A process for selectively separating a desired component from a hydrocarbon feedstream, comprising:
a) contacting the hydrocarbon feedstream with one side of a polymeric membrane assembly comprised of a housing containing at least one membrane element and at least one support material, wherein the membrane element is comprised of a polyimide hard segment and a soft segment, the polyimide hard segment is comprised of an anhydride HPDA and a diamine TMPA, and the soft segment comprises a polyadipate, a polysuccinate, a polymalonate, a polyoxalate, a polyglutanate, or a combination thereof, and
b) retrieving a permeate from the opposite side of the polymeric membrane assembly; wherein the concentration by wt % of the desired component in the permeate stream is higher than the concentration by wt % of the desired component in the hydrocarbon feedstream.

17. The process of claim 16, wherein the desired component is an aromatic compound.

18. The process of claim 17, wherein the support material is selected from the group consisting of polytetrafluoroethylene, aromatic polyamide fibers, porous metals, sintered metals, porous ceramics, porous polyester, porous nylon, activated carbon fibers, latex, silicone, silicone rubber, polyvinylfluoride, polyvinylidenefluoride, polyurethanes, polypropylenes, polyethylenes, polycarbonates, polysulfones, and polyphenylene oxides, metal foams, polymer foams, silica, porous glass, mesh screens, and combinations thereof.

19. The process of claim 18, wherein the membrane element and the support material are contained in a housing configuration selected from flat plate elements, wafer dements, spiral-wound elements, porous monoliths, porous tubes, and hollow fiber elements.

20. The process of claim 16, wherein the desired component is a sulfur heteroatom.

* * * * *